United States Patent
Terry et al.

(10) Patent No.: US 10,628,580 B2
(45) Date of Patent: Apr. 21, 2020

(54) CONTAINERS SHARED BY MULTIPLE USERS OF A DEVICE

(71) Applicant: Apple Inc., Cupertino, CA (US)

(72) Inventors: Andrew S. Terry, San Jose, CA (US); Kelly B. Yancey, Mountain View, CA (US); Pierre-Olivier J. Martel, Mountain View, CA (US); Richard L. Hagy, Montara, CA (US); Timothy P. Hannon, Mountain View, CA (US); Alastair K. Fettes, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 284 days.

(21) Appl. No.: 15/273,665

(22) Filed: Sep. 22, 2016

(65) Prior Publication Data

US 2017/0199883 A1    Jul. 13, 2017

Related U.S. Application Data

(60) Provisional application No. 62/276,896, filed on Jan. 10, 2016.

(51) Int. Cl.
*G06F 21/53* (2013.01)
*G06F 21/00* (2013.01)

(52) U.S. Cl.
CPC .............. *G06F 21/53* (2013.01); *G06F 21/00* (2013.01)

(58) Field of Classification Search
CPC ..................................................... G06F 21/53
See application file for complete search history.

(56) References Cited

U.S. PATENT DOCUMENTS

| | | | |
|---|---|---|---|
| 7,814,554 B1 * | 10/2010 | Ragner | G06F 21/52 713/165 |
| 8,161,173 B1 | 4/2012 | Mishra et al. | |
| 8,255,419 B2 | 8/2012 | Grebenik et al. | |
| 9,413,736 B2 | 8/2016 | Batson et al. | |

(Continued)

OTHER PUBLICATIONS

Windows—Can any user access the %APPDATA% folder—Stack Overflow, accessed Mar. 4, 2019 at https://stackoverflow.com/questions/7617594/can-any-user-access-the-appdata-folder (Year: 2013).*

(Continued)

*Primary Examiner* — William Spieler
(74) *Attorney, Agent, or Firm* — Morgan, Lewis & Bockius LLP

(57) ABSTRACT

Some embodiments provide a method for a device having multiple users. The method identifies a process installed on the device that requires an isolated storage in a file system of the device. For each of a set of the users of the electronic device, the method assigns at least one container for use by the process within a user-specific section of the file system. The containers assigned to the process in a section of the file system specific to a particular user are only accessible by the process when the particular user is logged into the device. The method assigns at least one container for use by the process within a non-user-specific section of the file system. The containers assigned to the process within the non-user-specific section of the file system are accessible by the process irrespective of which user is logged into the device.

22 Claims, 15 Drawing Sheets

(56) References Cited

U.S. PATENT DOCUMENTS

| | | | | |
|---|---|---|---|---|
| 9,445,271 | B2* | 9/2016 | Kim | H04W 12/08 |
| 2002/0035692 | A1* | 3/2002 | Moriai | G06F 21/10 |
| | | | | 713/189 |
| 2002/0157012 | A1* | 10/2002 | Inokuchi | G06F 21/10 |
| | | | | 713/193 |
| 2007/0061261 | A1* | 3/2007 | Kurihara | G06F 21/10 |
| | | | | 705/50 |
| 2008/0004886 | A1* | 1/2008 | Hames | G06F 21/10 |
| | | | | 705/26.1 |
| 2010/0312966 | A1* | 12/2010 | De Atley | G06F 21/53 |
| | | | | 711/118 |
| 2011/0010699 | A1* | 1/2011 | Cooper | G06F 21/12 |
| | | | | 717/169 |
| 2011/0251992 | A1* | 10/2011 | Bethlehem | H04L 12/2863 |
| | | | | 707/610 |
| 2011/0288932 | A1* | 11/2011 | Marks | G06Q 10/06 |
| | | | | 705/14.49 |
| 2012/0030172 | A1* | 2/2012 | Pareek | G06F 16/3331 |
| | | | | 707/635 |
| 2014/0108793 | A1* | 4/2014 | Barton | G06F 21/6218 |
| | | | | 713/165 |
| 2014/0122875 | A1 | 5/2014 | Pizi et al. | |
| 2014/0366157 | A1 | 12/2014 | Yancey et al. | |
| 2015/0082371 | A1 | 3/2015 | DeWeese et al. | |
| 2015/0205949 | A1* | 7/2015 | Iskin | G06F 21/51 |
| | | | | 713/187 |
| 2015/0381589 | A1* | 12/2015 | Tarasuk-Levin | H04L 63/0428 |
| | | | | 713/193 |

OTHER PUBLICATIONS

Windows—Where is the guideline that says you shouldn't write to the Program Files area?—Stack Overflow, accessed Mar. 4, 2019 at https://stackoverflow.com/questions/13163611/where-is-the-guideline-that-says-you-shouldnt-write-to-the-program-files-area (Year: 2012).*

Certification requirements for Windows Desktop Apps—Microsoft, accessed Mar. 4, 2019 at https://docs.microsoft.com/en-us/windows/desktop/win_cert/certification-requirements-for-windows-desktop-apps (Year: 2015).*

Looking for documentation on the right way to install apps on Windows 7—Stack Overflow, accessed Mar. 4, 2019 at https://stackoverflow.com/questions/5622681/looking-for-docunnentation-on-the-right-way-to-install-apps-on-windows-7 (Year: 2011).*

[Enigmail] Where are my GnuPG keys stored?, accessed Mar. 6, 2019 at https://www.enigmail.net/list_archive/2008-March/009003.html (Year: 2008).*

* cited by examiner

CONTAINERS SHARED BY MULTIPLE USERS OF A DEVICE

BACKGROUND

Sandboxing is a technique used in modern computing devices that enables applications to execute in an environment such that the application is only granted access to a particular portion of the file system of the device, in order to protect the security of application-specific data. Other applications cannot access that particular portion, but instead are restricted to their own portions of the file system. However, with multi-user devices, standard sandboxing alone will not prevent one user to access the data of another user if both users make use of the same application. Thus, there is a need for techniques that allow for optimal flexibility in data segregation for multi-user devices.

BRIEF SUMMARY

Some embodiments provide a method for assigning containers to processes (e.g., applications, daemons, etc.) in a multi-user device environment. For a device with multiple users, it may be beneficial for some data (e.g., large content assets) to be stored once and accessible by all users of the device, while user-specific data is stored separately for each user and inaccessible to the process when other users are logged on to the device. Thus, for at least a subset of the users, some embodiments assign a container for use by a process within a user-specific section of a file system of the device. In addition, the method assigns an additional container for use by the process within a non-user-specific section of the file system. The container in the user-specific section (and thus any data stored in the first container) is accessible by the process only when the specific user is logged into the device, and therefore not when any other users are logged into the device. The second container (and thus any data stored in the second container), on the other hand, is accessible by the process irrespective of which user is logged into the device.

The containers, in some embodiments, are specific locations (e.g., directories) in the file system created in such a way that prevents the processes from being able to access the container directly. For instance, some embodiments assign a random character string as a container name, and assign this as a root directory for a process. Neither the process to which the container is assigned nor any other processes (other than the operating system-level processes which handle the container creation and assignment in some embodiments) know the container name. Instead, when a process reads data from or writes data to a folder in its root directory, these container management processes route that data to the correct container. The container management processes create separate containers for the process in this manner for each user, and ensure (e.g., using sandboxing techniques) that the process only accesses its own containers for the user currently logged into the device, or its own multi-user containers.

The multi-user containers may be used for certain assets that should be shared among users, as well as for system-wide user-agnostic data and operations. For example, large content files (e.g., video, audio, large documents such as textbooks, etc.) may be downloaded and stored only once, with any user able to access the content. User-specific data about that content (e.g., highlighting, notes, or other annotations in a textbook) is then stored in the user-specific container for the relevant process, so that this personal information cannot be viewed by other users. In addition, in some cases the shared content file may be encrypted so as to limit access to the content file only to authorized users. In such cases, some embodiments store keys (or sets of keys) for accessing the encrypted content in the user-specific containers, such that only the authorized users can actually access the content.

Both user-specific and system-wide (non-user-specific) containers may also be assigned to multiple processes, allowing these processes to share data. For instance, a textbook or other content might not only need to be shared across multiple users, but could be accessible in multiple applications (e.g., a standard electronic books application as well as a school-specific application). In this case, the device creates a container in the system-wide directory that both of the processes are allowed to access irrespective of the user currently logged into the device.

In some embodiments, certain containers (both user-specific and system-wide containers) may have a first set of access privileges for some processes and a second, different set of access privileges for other processes. As an example, a mapping application (or a daemon associated with a mapping application) might have the responsibility of downloading map tiles from an external server for use by the mapping application to display maps. These map tiles, often cached by the mapping application, are the sort of data that are useful to store in a system-wide container, as re-downloading and storing multiple copies of a map tile for different users is an unnecessary use of resources. In addition, many other applications use these map tiles in some embodiments to display maps in their own interfaces. Thus, some embodiments store the map tiles in a system-wide container that can be written to only by the mapping application process but is readable by many other processes.

As mentioned, to enforce the container restrictions (both user-based restrictions and process-based restrictions), some embodiments use sandboxing techniques. Specifically, when a process launches, it does not initially have access to any of the containers. In some embodiments, an operating system process (e.g., a container management daemon) receives entitlement data from the process and, based on this data, grants the process access to the appropriate containers given the currently logged in user. These will include any system-wide containers that the process is entitled to access (some of which may be shared with other processes) as well its containers for the current user (again, some of which may be shared with other processes). When the process attempts to read and/or write data, the container management daemon (or other operating system process) ensures that the data is read from and/or written to the appropriate container.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description, and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
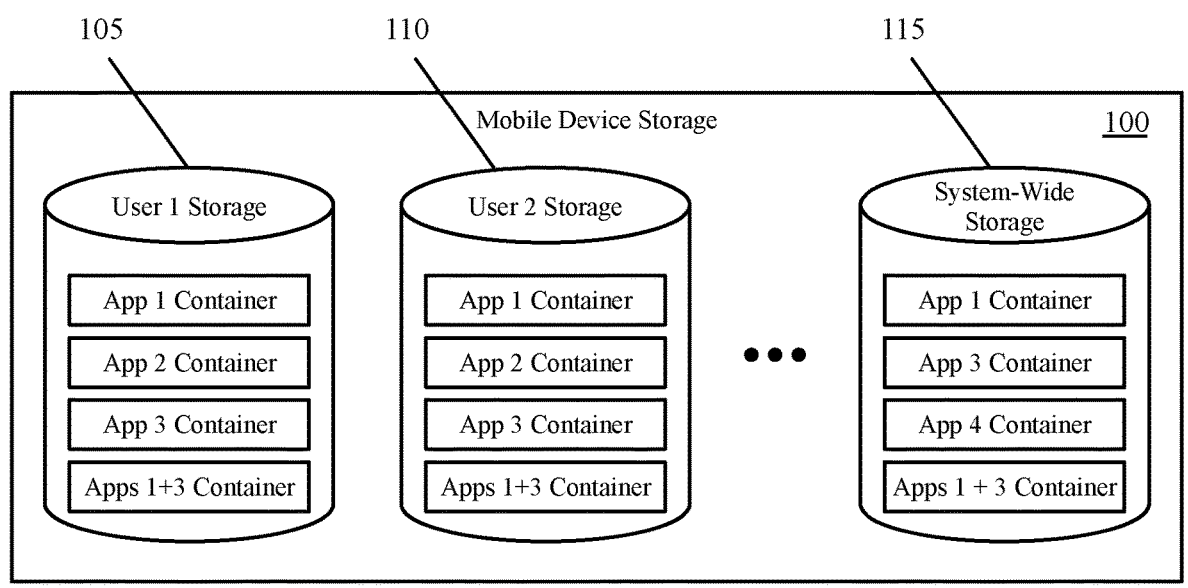
FIG. 1 conceptually illustrates a mobile device storage with various different types of containers.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for assigning containers to processes (e.g., applications, daemons, etc.) in a multi-user device environment. For a device with multiple users, it may be beneficial for some data (e.g., large content assets) to be stored once and accessible by all users of the device, while user-specific data is stored separately for each user and inaccessible to the process when other users are logged on to the device. Thus, for at least a subset of the users, some embodiments assign a container for use by a process within a user-specific section of a file system of the device. In addition, the method assigns an additional container for use by the process within a non-user-specific section of the file system. The container in the user-specific section (and thus any data stored in the first container) is accessible by the process only when the specific user is logged into the device, and therefore not when any other users are logged into the device. The second container (and thus any data stored in the second container), on the other hand, is accessible by the process irrespective of which user is logged into the device.

The containers, in some embodiments, are specific locations (e.g., directories) in the file system created in such a way that prevents the processes from being able to access the container directly. For instance, some embodiments assign a random character string as a container name, and assign this as a root directory for a process. Neither the process to which the container is assigned nor any other processes (other than the operating system-level processes which handle the container creation and assignment in some embodiments) know the container name. Instead, when a process reads data from or writes data to a folder in its root directory, these container management processes route that data to the correct container. The container management processes create separate containers for the process in this manner for each user, and ensure (e.g., using sandboxing techniques) that the process only accesses its own containers for the user currently logged into the device, or its own multi-user containers.

The multi-user containers may be used for certain assets that should be shared among users, as well as for system-wide user-agnostic data and operations. For example, large content files (e.g., video, audio, large documents such as textbooks, etc.) may be downloaded and stored only once, with any user able to access the content. User-specific data about that content (e.g., highlighting, notes, or other annotations in a textbook) is then stored in the user-specific container for the relevant process, so that this personal information cannot be viewed by other users. In addition, in some cases the shared content file may be encrypted so as to limit access to the content file only to authorized users. In such cases, some embodiments store keys (or sets of keys) for accessing the encrypted content in the user-specific containers, such that only the authorized users can actually access the content.

Both user-specific and system-wide (non-user-specific) containers may also be assigned to multiple processes, allowing these processes to share data. For instance, a textbook or other content might not only need to be shared across multiple users, but could be accessible in multiple applications (e.g., a standard electronic books application as well as a school-specific application). In this case, the device creates a container in the system-wide directory that both of the processes are allowed to access irrespective of the user currently logged into the device.

In some embodiments, certain containers (both user-specific and system-wide containers) may have a first set of access privileges for some processes and a second, different set of access privileges for other processes. As an example, a mapping application (or a daemon associated with a mapping application) might have the responsibility of downloading map tiles from an external server for use by the mapping application to display maps. These map tiles, often cached by the mapping application, are the sort of data that are useful to store in a system-wide container, as re-downloading and storing multiple copies of a map tile for different users is an unnecessary use of resources. In addition, many other applications use these map tiles in some embodiments to display maps in their own interfaces. Thus, some embodiments store the map tiles in a system-wide container that can be written to only by the mapping application process but is readable by many other processes.

As mentioned, to enforce the container restrictions (both user-based restrictions and process-based restrictions), some embodiments use sandboxing techniques. Specifically, when a process launches, it does not initially have access to any of the containers. In some embodiments, an operating system process (e.g., a container management daemon) receives entitlement data from the process and, based on this data, grants the process access to the appropriate containers given the currently logged in user. These will include any system-wide containers that the process is entitled to access (some of which may be shared with other processes) as well its containers for the current user (again, some of which may be shared with other processes). When the process attempts to read and/or write data, the container management daemon (or other operating system process) ensures that the data is read from and/or written to the appropriate container.

The above description describes examples of containers for the multi-user devices of some embodiments. Several more detailed examples are described below. Section I describes the creation and setup of containers on such multi-user devices. Section II then describes various examples of the use of such containers. Finally, Section III describes an electronic system with which some embodiments of the invention are implemented.

I. Containers on Multi-User Device

FIG. 1 conceptually illustrates a mobile device storage 100 with various different types of containers (i.e., user-specific containers that are both single-process and shared between processes as well as system-wide containers that are both single-process and shared between processes). As shown in this figure, each container represents a portion of the available device storage. The containers may be stored in non-volatile (e.g., hard disk, solid state) or volatile (e.g., RAM) storage in different embodiments. In addition, though shown to be of equal size, in various embodiments the containers may have different fixed sizes based on the needs of their respective processes or may have varying sizes, with containers expanding in size as more data is stored in them.

In this example, the mobile device has at least two users, and at least four applications for which containers are required. In some embodiments, the mobile device is a device that can operate in either single-user mode or multi-user mode, depending on its settings. For instance, users of a smart phone or tablet will typically run their device in single-user mode. However, mobile devices owned by an organization, such as a corporation, school, sports team, etc., might want to have their mobile devices operate in multi-user mode. As examples, a school could have textbooks on tablet computers that may be used by different students during different periods of the school day, or different days, or a sports team could have its playbooks on tablet computers that may be used by different players or coaches at different times.

Though shown in these examples as application containers, in some embodiments containers may be created for any type of process, including OS-level daemons, application-level daemons, native applications, and/or third-party applications. As shown, the storage 100 is segregated by user, with separate storage sections (e.g., separate directories) for each user. The figure illustrates a first storage 105 for the first user, a second storage 110 for the second user, as well as a system-wide storage 115 accessible when any user is logged into the device.

Both the first storage 105 and the second storage 110 include containers for application 1, application 2, and application 3, as well as a container shared by applications 1 and 3. Shared containers are described in further detail in U.S. Patent Publication 2014/0366157, which is incorporated herein by reference. The system-wide storage 115 includes containers for application 1, application 3, and application 4, as well as a container shared by applications 1 and 3. Though this example shows application 1 and application 3 sharing data, it should be understood that different combinations of applications sharing data are possible. For example, application 1 could have the first container shared with application 3 as well as a second container shared with application 2, for each user. In addition, application 1 might have the first container shared with application 3 for each user, while having a different system-wide container shared with application 4.

In some embodiments, some processes (e.g., application 2 in this case) may not need any system-wide storage, and therefore only store information on a per-user basis. In addition, some embodiments restrict the use of system-wide storage to only native applications and processes, and restrict third-party applications from storing data that is shared across users (e.g., for security reasons). In addition, some processes may only use the system-wide storage, because these processes do not need to store any user-specific data. For instance, certain device activation or other system-level processes may be user-agnostic, and thus do not require any user-specific containers.

Figure 2:
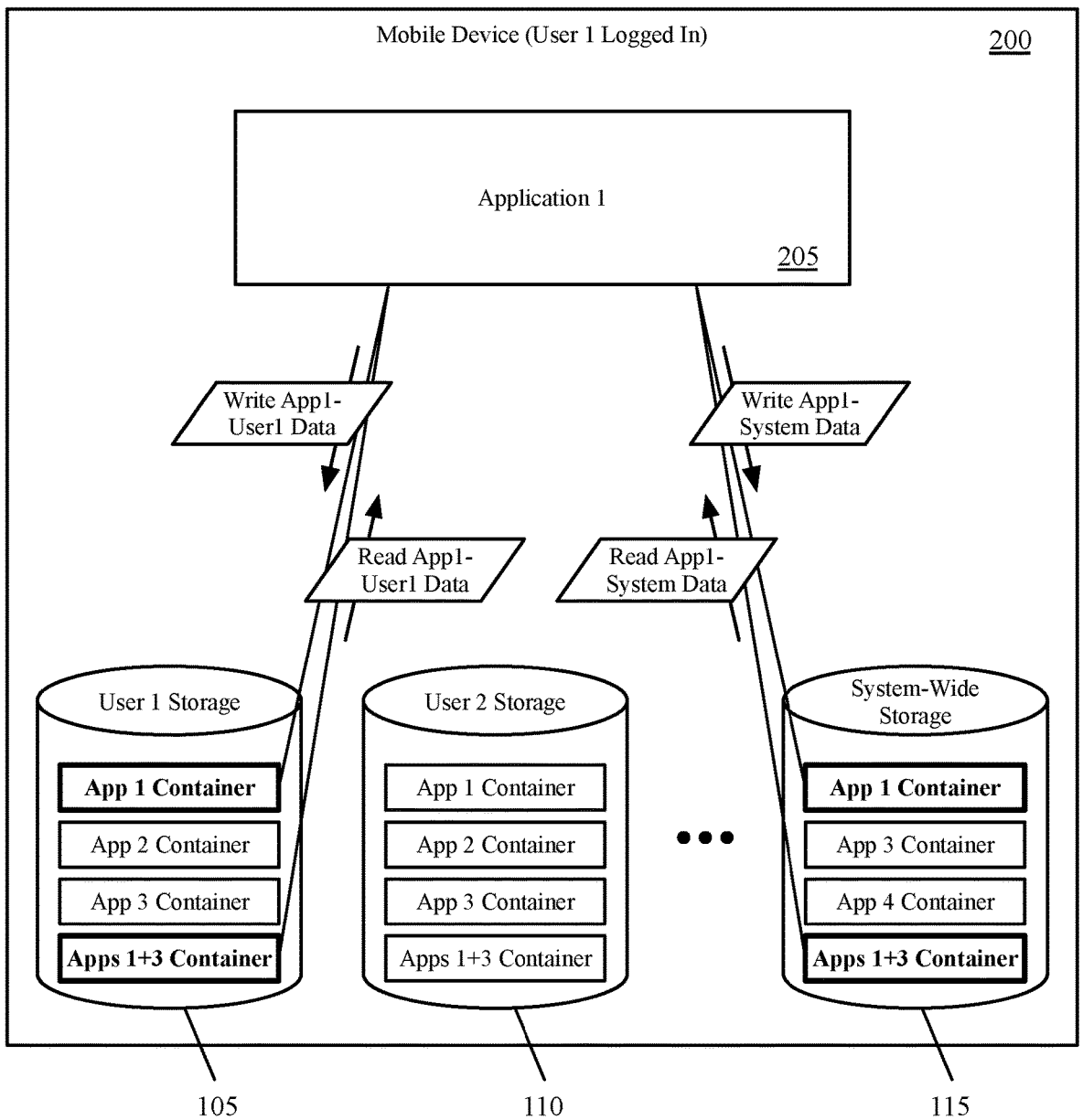
FIGS. 2 and 3 illustrate a mobile device that includes the storages of FIG. 1 with different users logged into the mobile device.
Figure 3:
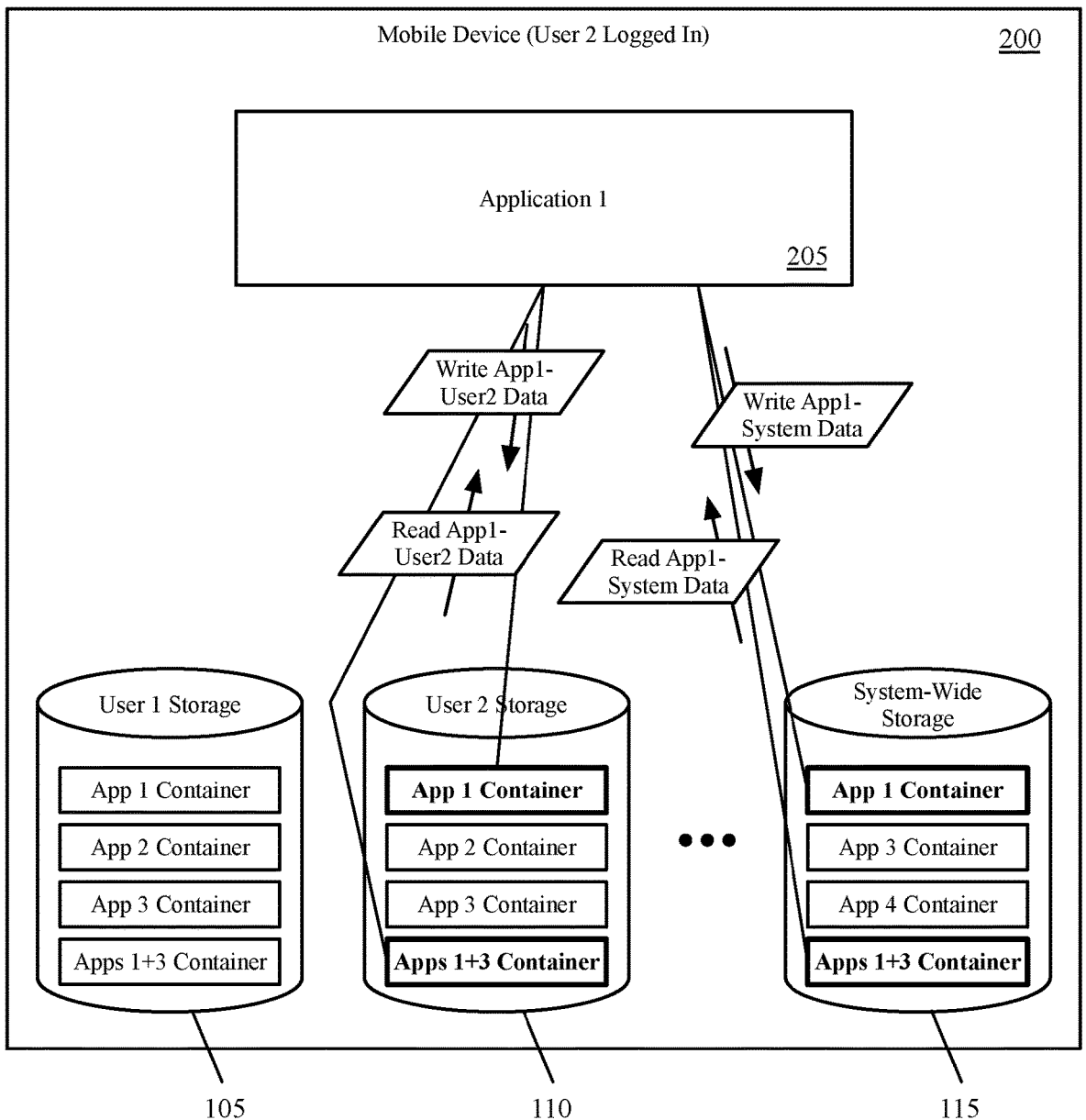

FIGS. 2 and 3 illustrate a mobile device 200 that includes the storages 105-115. Specifically, FIG. 2 illustrates the mobile device 200 with the first user logged in, while FIG. 3 illustrates the mobile device 200 with the second user logged in. In both examples, the current user of the device is utilizing application 1 205. As shown in FIG. 2, with the first user logged in, the application 205 reads data from and writes data to both its application-specific container and the container shared with application 3 in the storage 105. Similarly, the application 205 also reads data from and writes data to both its application-specific container and the shared container in the system-wide storage 115. However, with the first user logged in, the application 205 does not access (for read or write purposes) any of the containers in the storage 110.

In FIG. 3, as mentioned, the second user has logged into the device 200, and is also running the application 205. As shown, with the second user logged in, the application 205 reads data from and writes data to both its application-specific container and the container shared with application 3 in the storage 110. Similarly, the application 205 also reads data from and writes data to both its application-specific container and the shared container in the system-wide storage 115. However, with the second user logged in, the application 205 does not access (for read or write purposes) any of the containers in the storage 105 (or the storages for any other user).

As mentioned, in some embodiments, these containers are implemented as directories in the file system. For instance, some embodiments create a set of directories for each user (e.g., "var/user1/containers/", "var/user2/containers/", etc.) as well as a separate directory for system-wide containers (e.g., "var/containers/"). Each container is then created with a randomized UUID, such as a random string with numerous characters. For instance, a first process might have a first-user home directory of "var/user1/containers/<UUID1>", a second-user home directory of "var/user2/containers/<UUID2>", and a system-wide home directory of "var/containers/<UUID3>". Meanwhile, a second process on the device could have a first-user home directory of "var/user1/containers/<UUID4>", a second-user home directory of "var/user2/containers/<UUID5>" and a system-wide home directory of "var/containers/<UUID6>".

In some embodiments, for a multi-user device, the user-specific containers are created by the device for each process upon the process first launching on the device for a particular user. Similarly, the system-wide containers are created by the device the first time the process requiring such a container launches on the device. This may occur at initial boot of the device for many user-agnostic system processes that do not have user-specific containers. Such processes may launch when the device initially boots up, and thus the device creates their system containers at that time. For other user-launched applications, the device creates the required system-wide containers the first time any user launches the application, and creates the user-specific containers each time a new user first launches the application.

Figure 4:
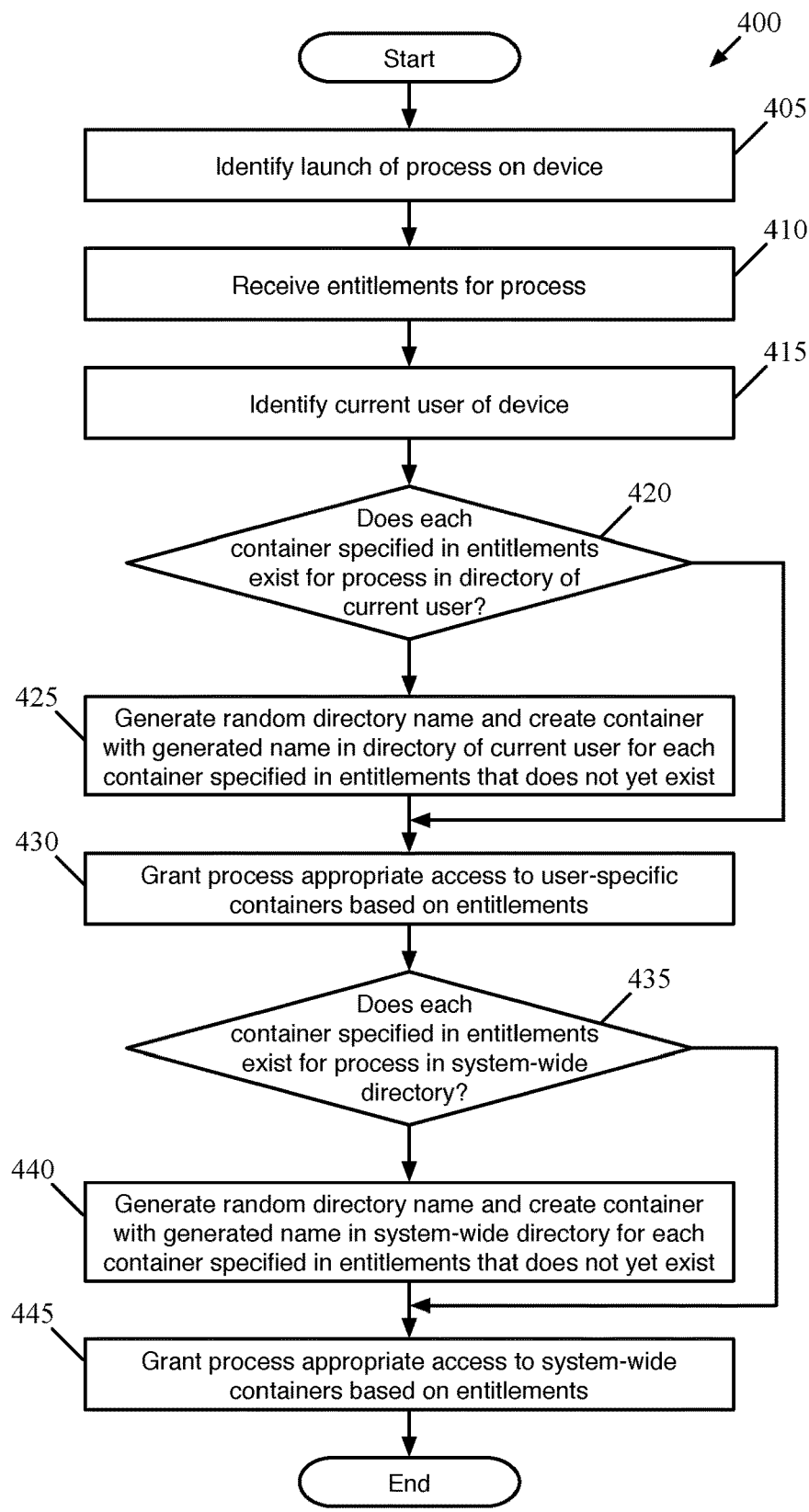
FIG. 4 conceptually illustrates a process of some embodiments for creating and granting access to containers for a multi-user device.

FIG. 4 conceptually illustrates a process 400 of some embodiments for creating and granting access to containers for a multi-user device. The process 400, in some embodiments, is performed by a container management module (e.g., an operating system level daemon) when a process launches on the multi-user device. This container management module is responsible for ensuring that each process (i) has its required containers created for a current user of the device (in addition to any required system-wide containers) and (ii) is granted access to those containers and only those containers. In some embodiments, the operation of a single-user device is somewhat different, in that the container creation takes place at installation time (e.g., initial boot for pre-installed processes and applications) rather than during runtime.

As shown, the process 400 begins by identifying (at 405) the launch of a process on the multi-user device. The process being launched could be an operating system (e.g., OS-kernel) daemon, a native or third-party application, a daemon associated with such an application, etc. For some processes, as mentioned, this launch may occur when the device is initially booted up or a user logs into the device (which may occur at the same time). For example, many OS-level processes start at login or boot. As such, this process 400 may be performed (e.g., in parallel) at boot for many processes. On the other hand, applications will generally not start until the user initiates a launch of the application.

The process 400 then receives (at 410) entitlements for the newly launched process. In some embodiments, the entitlements specify to which containers the process should have access. For instance, the entitlements may specify some or all of (i) whether the process requires its own user-specific container, (ii) whether the process should have access to any shared user-specific shared containers (and what type of access), and with which applications those containers should be shared, (iii) whether the process requires its own system-wide container, and (iv) whether the process should have access to any system-wide shared containers (and what type of access), and with which applications those containers should be shared.

In some embodiments, the user-specific and/or system-wide process-specific container is created automatically (that is, each process is automatically entitled to its own container for each user and for shared data, and this container will always be created at first launch). However, some embodiments create only system-wide containers for certain user-agnostic processes. For example, device activation processes that set up a device may not require any user-specific containers. On the other hand, some embodiments do not allow system-wide containers for third-party applications, or other categories of application. In some embodiments, each process is allowed to have both a user-specific container for each user and a shared container for each user, so long as that process affirmatively declares that container in its entitlements (e.g., with a Boolean true value opting into the use of the container). Thus, processes that will not use either the user-specific or the system-wide container can avoid asking the device to create unnecessary containers.

For containers shared among multiple processes (either user-specific or system-wide), some embodiments determine the entitlements based on declarations of container access. Each shared container has a different container name (the container names being different from the randomized directory names in the file system), and the process can opt into multiple such shared containers using these names. For native processes and applications, in some embodiments these names are agreed-upon by the mobile device manufacturer and/or OS developer. For third-party applications, some embodiments use an application verification system (e.g., operated by the mobile device manufacturer and/or OS developer) that only allows verified applications to be installed on the devices. The application verification system is responsible for ensuring that third-party applications only declare entitlements to containers that they are allowed to use by, e.g., only allowing sharing between third-party applications from the same developer (using, e.g., a developer identifier).

For example, if a developer creates multiple related applications (e.g., a fantasy football app and a fantasy baseball app), the developer can allow these applications to share data by having the applications read/write certain data from/to a shared container (either a user-specific shared container, system-wide shared container, or both depending on the type of data). Similarly, native applications can share data with each other in some cases, such as a native book reader application, native bookstore application, and native online learning application all sharing data. Some native applications may also permit other applications to read data from and/or write data to a shared container as well, in some embodiments by, e.g., publishing a shared container name for usage by other applications.

The process 400 also identifies (at 415) the current user of the device. This may be a user who has just logged into the device, causing the launch of various system processes, or a user that has initiated the launch of the application.

Next, the process 400 determines (at 420) whether each container specified in the entitlements exists for the process in the directory of the current user. In some embodiments, the container manager stores (e.g., in secured memory that other applications/users cannot access) a mapping of containers to users and applications. If a container has been previously created for the recently launched process, then the container manager is aware of that container and identifies that the container does not need to be created. In general, the first time a process is launched for a particular user, the container manager will need to create new containers for that process. However, containers shared with other processes may already be created, if at least one of those other processes has previously been launched for the particular user. In this case, the container manager will not need to create this new container.

For each container required by the newly launched process that does not already exist within the current user's directory, the process 400 generates (at 425) a random directory name and creates a container with the generated directory name in the directory of the current user. The container manager also stores the mapping of the process (or declared container name for a shared container) and user to the container's generated directory name for future use. As mentioned above, some embodiments use sufficiently long random strings for the directory names that serve as UUIDs to prevent unauthorized access to the containers (by other users or by other processes).

The process 400 also grants (at 430) the newly launched process appropriate access to the user-specific containers based on the entitlements. This access may be read/write access (most commonly) or read-only access. The read-only access will generally be for containers shared between multiple processes, in which only certain processes are allowed to write data to the container. To grant this access, some embodiments share the mapping with a separate module that handles read/write calls from the running processes and maps these calls to the appropriate containers. That is, when a process writes data to or reads data from a folder in its home directory, this separate module (which in some embodiments is part of the same container manager that performs the creation) maps this request from a root call to the appropriate directory (e.g., within the current user folder and with the correct random string for the process making the call).

The process 400 also determines (at 435) whether each container specified in the entitlements exists for the process in the system directory. As mentioned, the container manager of some embodiments stores (e.g., in secured memory that other applications/users cannot access) a mapping of system-wide containers (directory names) to processes and/or container names. If a container has been previously created for the recently launched process, then the container manager is aware of that container and identifies that the container does not need to be created. In general, the first time a process is launched for any user, the container manager will need to create new containers for that process. However, system-wide containers shared with other processes may already be created, if at least one of those other processes has previously been launched for any user. In this case, the container manager will not need to create this new container.

For each container required by the newly launched process that does not already exist within the system-wide directory, the process 400 generates (at 440) a random directory name and creates a container with the generated directory name in the system-wide directory. The container manager also stores the mapping of the process (or declared container name for a shared container) to the container's generated directory name for future use. As mentioned above, some embodiments use sufficiently long random strings for the directory names that serve as UUIDs to prevent unauthorized access to the containers by other processes.

The process 400 also grants (at 445) the newly launched process appropriate access to the system-wide containers based on the entitlements. This access may be read/write access (most commonly) or read-only access. The read-only access will generally be for containers shared between multiple processes, in which only certain processes are allowed to write data to the container. To grant this access, some embodiments share the mapping with a separate module that handles read/write calls from the running processes and maps these calls to the appropriate containers. That is, when a process writes data to or reads data from a folder in its system-wide home directory, this separate module (which in some embodiments is part of the same container manager that performs the creation) maps this request from a root call to the appropriate directory (e.g., with the correct random string for the process making the call). With all the containers created and mapped to the launched process, the process 400 ends.

While FIGS. 1-3, as well as the subsequent figures in Section II illustrate the applications communicating directly with the storages for simplicity, in some embodiments the creation of containers as well as their communication with the containers is performed through OS-level processes that ensure that the processes are only able to communicate with their respective containers and that only containers for the current user (or system-wide containers) are accessed by the processes.

Figure 5:
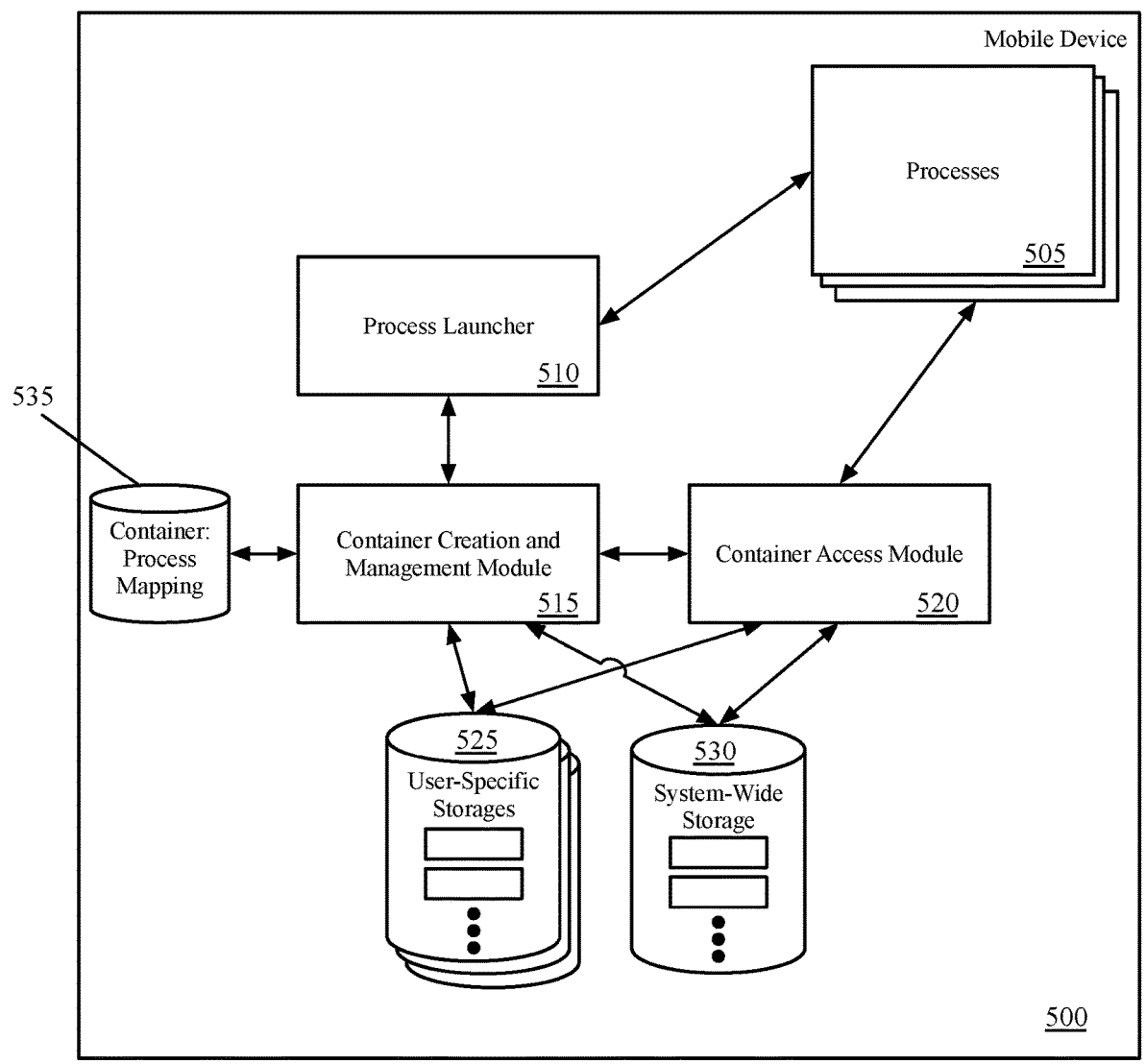
FIG. 5 conceptually illustrates a device architecture of some embodiments for handling container creation in multi-user mode and managing access of various processes to those containers.

FIG. 5 conceptually illustrates a device 500 (e.g., a mobile device) architecture of some embodiments for handling container creation in multi-user mode and managing access of various processes to those containers. As shown, the device 500 includes a set of processes 505, a process launcher 510, a container creation and management module 515, and a container access module 520. One of ordinary skill in the art will recognize that a mobile device will include many other modules as well (though many of these would fall under the set of processes 505), but only the above are shown in this figure in order to best illustrate the container management operations.

In some embodiments, the process launcher 510, container creation and management module 515, and container access module 520 are part of the operating system of the device. For instance, in some embodiments, at least the container creation and management module 515 and container access module 520 are OS kernel-level operations. In some embodiments, these modules are part of a secured portion of the device that prevents unauthorized access so as to ensure data security between users and processes.

In addition, the mobile device includes container storages 525 for user-specific containers and 530 for system-wide containers. The user-specific storages 525, in some embodiments, each represent a separate user home directory stored on the device, while the system-wide storage 530 represents a separate directory for system-wide storages. Each of these storages 525 and 530 stores multiple containers which, as shown above, may be single process containers or containers shared between multiple processes. It should be noted that, while these containers are shown in this figure as well as those above and below as being stored on the device 500, in some embodiments some or all of the container data may be stored in a secure manner in a network storage (e.g., cloud storage). For instance, some or all of the users of a multi-user device may have cloud storage accounts, and the container data may be stored in these accounts so that it can be shared among different devices associated with the user.

The processes 505 may be, as mentioned, all sorts of processes, including OS-level processes, native applications, third-party applications, daemons or other processes associated with such applications, etc. As various examples, these processes could include a device pairing process that is part of the operating system, multiple mapping processes associated with a native mapping application, several related third-party fantasy sports applications, etc. In some embodiments, the code defining the operation of an application is stored in a separate application bundle container and that code is executed at runtime when the application is launched, which is what the processes 505 represent. Each process specifies its entitlements regarding to which containers it requires access. As described above, this may include affirmative requests for its own user-specific and/or system-wide containers, as well as identification by name of any shared containers to which the process expects access. These requests may be approved by the device manufacturer and/or operating system developer for native applications and processes, and by an application verification system for third-party applications.

The process launcher 510 is responsible for managing the startup of the processes 505. As noted, in some embodiments, the process launcher 510 is an OS-level process. The process launcher 510 of some embodiments handles various aspects of launching an application or other process 505 on the device, including reading its container entitlement information and passing this information to the container creation and management module 515. The launch of a process may take place at startup or user login of the device, or at a later time when a user opens an application.

The container creation and management module 515 determines, when a process 505 launches in multi-user mode, whether all of the containers to which that process is entitled have been created. If any containers need to be created, the container creation and management module 515 creates these containers in the appropriate home directory. This module 515 is an OS-kernel-level daemon, in some embodiments, that works with the container access module 520 to ensure that only the appropriate containers are accessed for any application-user combination. The container creation and management daemon performs the process 400 or a similar process in some embodiments when it is notified by the process launcher that a process 505 has launched.

As shown, the container creation and management module 515 uses a container:process mapping storage 535 to determine whether to create any new containers when a process launches as well as to identify to which containers a process should be granted access. When a process 505 requires a new container that does not yet exist in either the current-user storage 525 or the system-wide storage 530, the container creation and management daemon 515 creates this new container in the appropriate storage and stores the mapping in the container:process mapping storage 535 for further use. In addition, the container creation and management module 515 of some embodiments passes the container mappings for the recently-launched process 505 to the container access module 520, which enforces the container access rules during runtime.

The container access module 520 is a sandbox administration module or daemon in the OS-kernel in some embodiments that enforces "sandboxing" of the processes 505 to their respective containers. That is, this module enables the application to act as though its containers are the only directories on the device. During runtime, when an application makes a read or write call to its home directory for the current user, the container access module uses its list of process to container mappings received from the container creation and management module 515 to transform this call to the directory for the process 505 making the call. Similar operations are performed for read/write calls to the system-wide containers and multi-application containers (both user-specific and system-wide) as well. Thus, the container creation and management module 515 handles the creation of these containers at installation/launch time, while the container access module 520 handles the enforcement of the restricted access to the containers at runtime in some embodiments.

II. Usage of User-Specific and System-Wide Containers

FIGS. 6-10 illustrate various examples of the use of different types of containers to share certain data across multiple users but store other data separately for each user of a device. While these examples illustrate the devices as mobile devices (e.g., smart phones, tablets, etc.), it should be understood that the examples and inventive principles could apply to other types of computing devices as well, such as laptop or desktop computers, etc.

Figure 6:
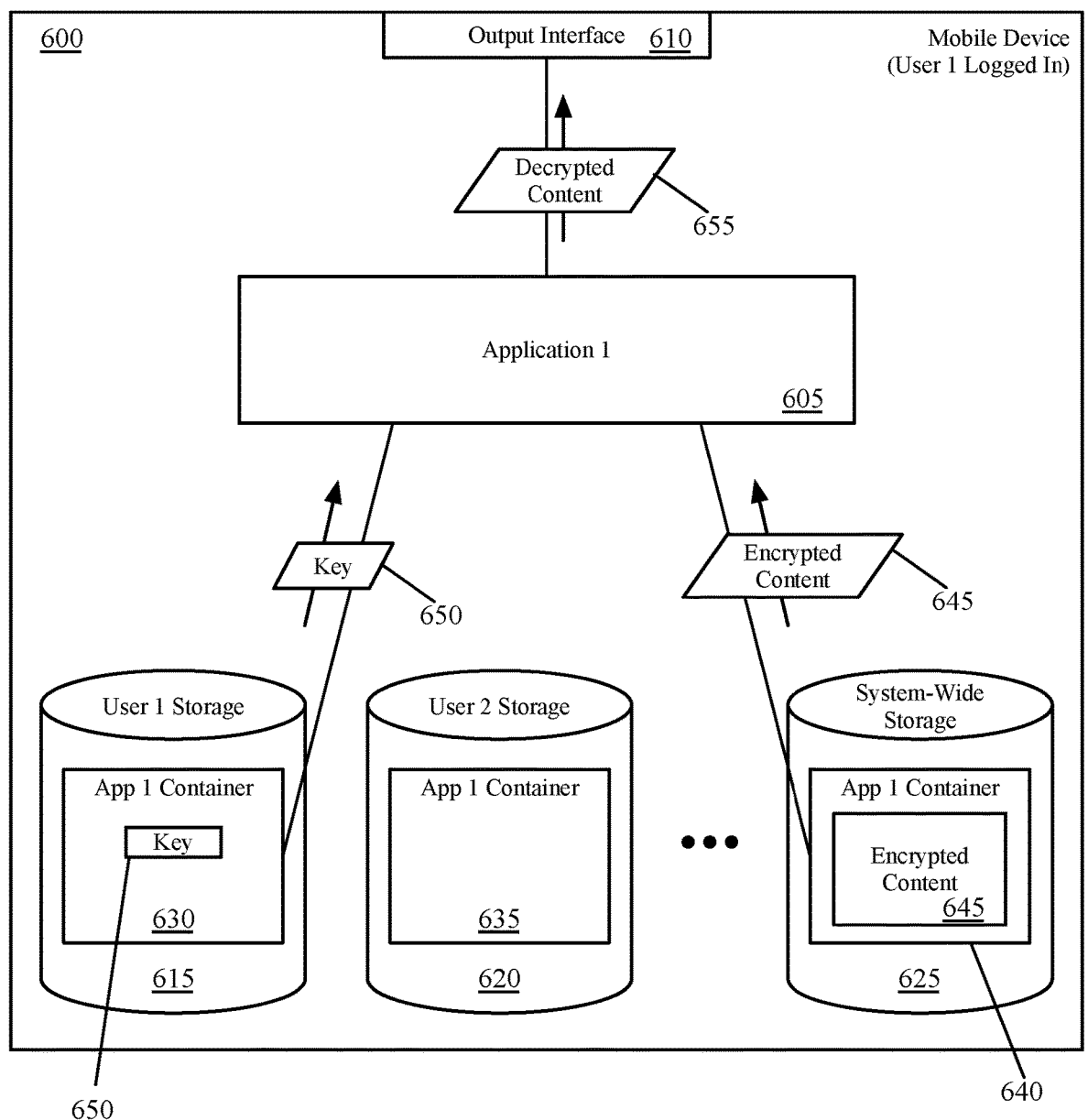
FIGS. 6 and 7 illustrate an example of a data asset that is split between a user-specific container and a system-wide container for an application.
Figure 7:
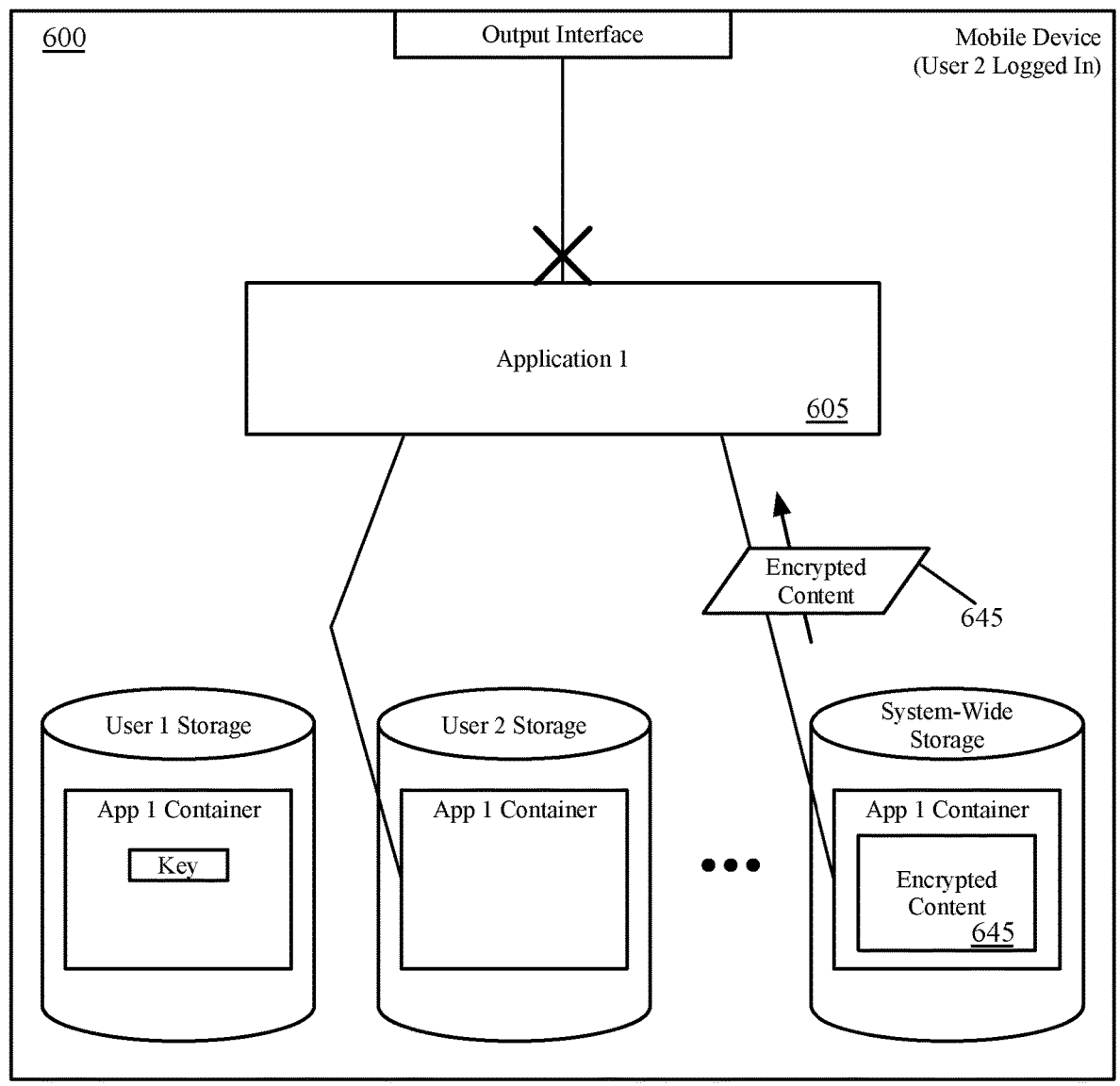

FIGS. 6 and 7 illustrate an example of a data asset that is split between a user-specific container and a system-wide container for an application. Though these figures illustrate a single-application container, one of ordinary skill in the art will recognize that a similar concept could apply to a container accessible by multiple applications.

Specifically, FIG. 6 illustrates a mobile device 600 on which an application 605 that consumes encrypted content operates. This application could be a media player application (e.g., a video player, audio player, etc.), a book reader application, etc. The application might also be a process within an application, or even a process separate from an application in some embodiments. The mobile device 600 also includes an output interface 610 to which decrypted content may be output (e.g., an audio output, display screen, wired or wireless connection, etc.), as well as storages 615 and 620 for at least first and second users and a system-wide storage 625. The storage 615 for the first user includes a container 630 for the application 605, the storage 620 for the second user includes a container 635 for the application 605, and the system-wide storage 625 includes a container 640 for the application 605.

In the example of FIG. 6, the first user is logged into the mobile device 600. As such, the container management modules of the mobile device 600 (e.g., the container access module 520 of FIG. 5, that handles sandboxing of the applications) allow the application 605 to access its container 630 in the first user storage 615 and the container 640 in the system-wide storage, but not the container 635 in the second user storage 620. In addition, the application 605 would be permitted by the container management modules to access any other containers in the storages 615 and 625 to which it is entitled (e.g., containers shared with other applications).

In this case, the container 640 stores encrypted content 645. This encrypted content might be a readable document (e.g., an electronic textbook, novel, article, etc.), video or audio content, or any other content that the publisher and/or distributor of the content encrypts. In some embodiments, the content is encrypted to a key that only authorized users and/or devices are allowed to possess. Because the encrypted content 645 is not stored with this key, the content is only accessible by users of the mobile device 600 that possess the key.

As shown, the container 630 for the first user stores a key 650 that enables access to the encrypted content 645. Thus, when a user provides input to access (e.g., read, listen to, view, etc.) the content, the application 605 reads (i) the encrypted content 645 from the container 640 and (ii) the key 650 from the user-specific container 630. The application uses the key 650 to decrypt the content and outputs decrypted content 655 to the output interface 610. It should be noted that, in various different embodiments, key 650 may not directly decrypt the encrypted content 645. For instance, the user might have a user-specific key to which a content key is encrypted by the distributor of the content. In this case, the application 605 (or a set of processes called by the application) would decrypt the content key with the user-specific key and then decrypt the encrypted content with the content key. This layer of indirection enables the content to be encrypted to a single key, but different users to access the content with their respective different keys. In some embodiments, the content key is sent encrypted to the user's key, but stored in the user-specific container in plaintext after being decrypted by the user's key.

FIG. 7 illustrates the mobile device 600 when the second user is logged into the device. In this case, if the application 605 attempts to access the encrypted content 645 from the system-wide container 645, the application 645 will not be able to decrypt the content 645 because the container 635 for the second user does not store a key for accessing this content, and thus cannot output the content. However, the application 605 will generally not actually attempt to access this content, knowing that it does not have the key to do so. In addition, it should be noted that, while shown as empty, the container 635 might store keys or other information for accessing other content.

Figure 8:
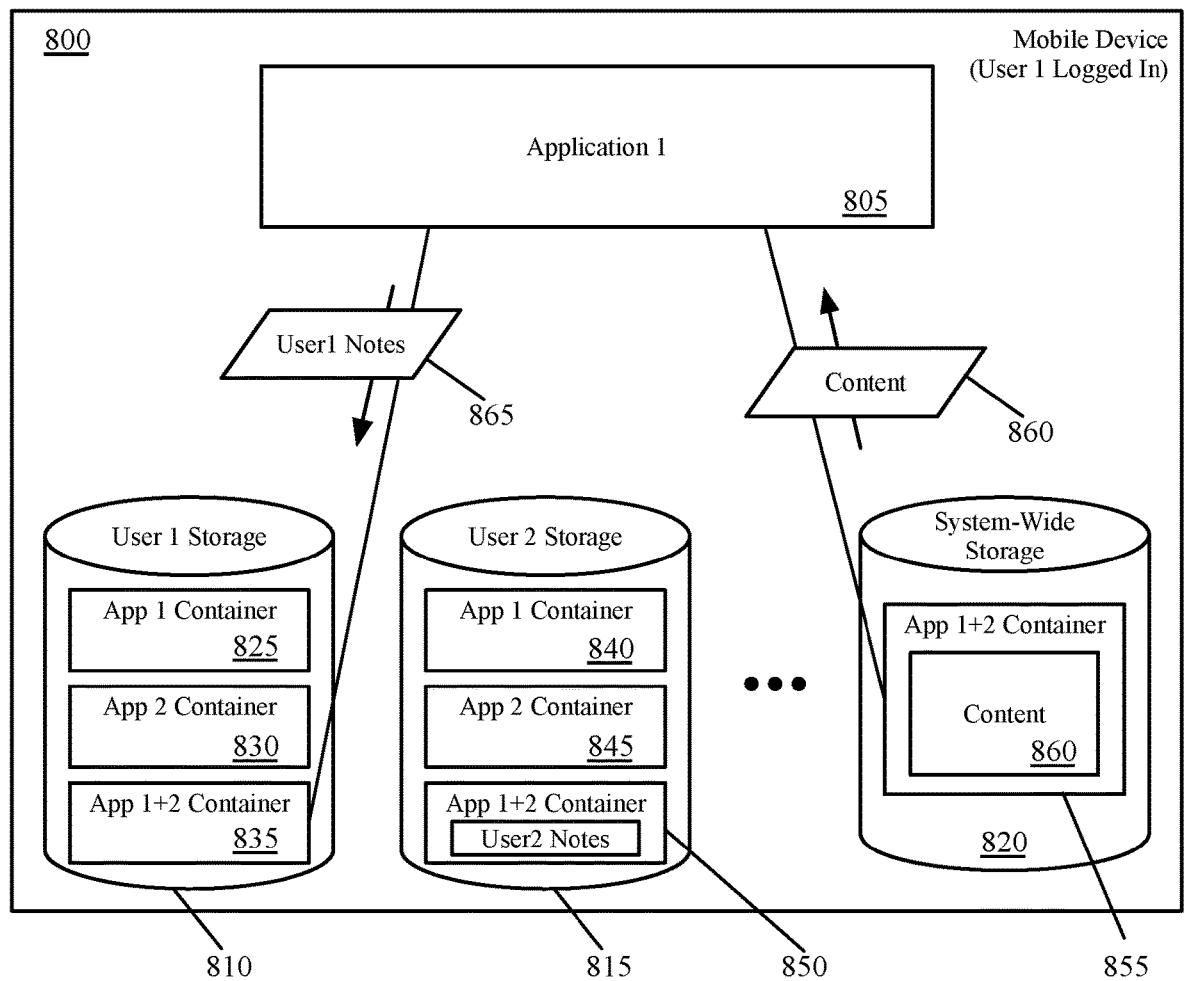
FIGS. 8 and 9 illustrate an example of the use of a system-wide multi-application container in a mobile device, with different applications able to access (for read and write purposes) both user-specific and system-wide containers.
Figure 9:
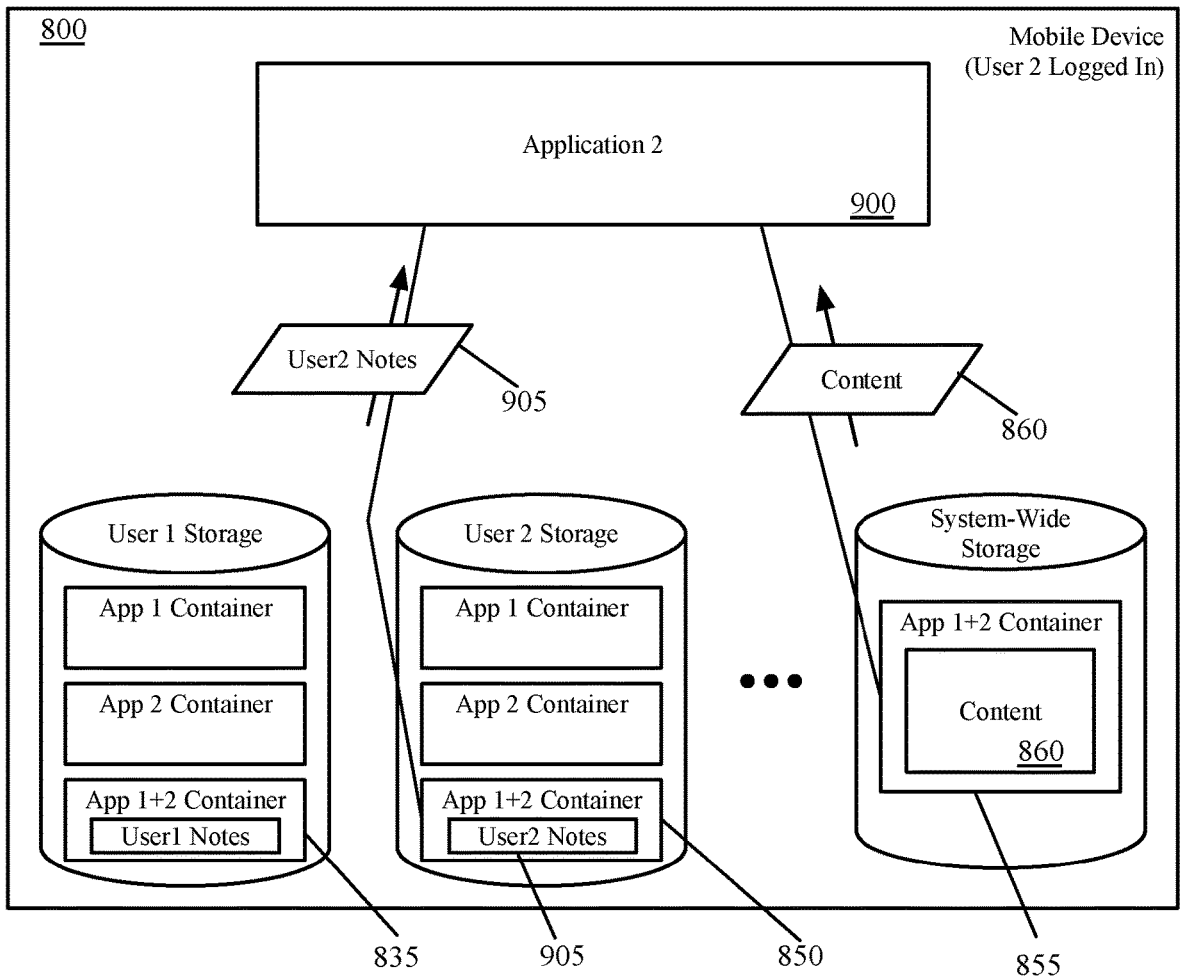

FIGS. 8 and 9 illustrate an example of the use of a system-wide multi-application container in a mobile device 800, with different applications able to access (for read and write purposes) both user-specific and system-wide containers. FIG. 8 illustrates the mobile device 800 with a first user logged into the device and a first application 805 operating. As shown, the mobile device 800 includes storages 810 and 815 for at least first and second users as well as a system-wide storage 820. The storage 810 for the first user includes a container 825 for the first application 805, a container 830 for a second application, and a container 835 accessible by both the first and second applications. Similarly, the storage for the second user includes a container 840 for the first application 805, a container 845 for the second application, and a container 850 accessible by both the first and second applications.

The system-wide storage 820, on the other hand, only includes a container 855 accessible by both the first and second applications. This container 855 stores content 860, which is accessible by both of these applications irrespective of which user is logged into the device 800. In some embodiments, applications might not require their own system-wide container if, for example, all of their system-wide data is also shared with other applications. For instance, the application might only share large content files across users, which are also accessible by other applications on the device.

In the example of FIG. 8, the first application 805 reads the content file 860 from the system-wide multi-application container 860. This content could be, for example, a textbook shared between an online learning application and a book reader and/or bookstore application. As another example, many sports teams now use tablets for, e.g., playbooks. A team-owned device might have multiple users and different applications for different positions or position groups, which could all share the same playbook content. Even if only a single application required the playbook, this data could be stored in a system-wide container so that the same playbook would not need to be stored separately for different users.

Based on user input, the application 805 stores notes 865 made by the first user regarding the content 860. In the textbook example, these notes might be highlighting, text or audio notes, etc. Regardless of the type of annotation, the application stores this data in the container 835 such that (i) the notes will only be accessible when the first user logs into the device 800 and (ii) the notes will be accessible to that first user irrespective of whether the user accesses the content 860 via the first or second application. In other examples, the application 805 might store certain data regarding the content 860 in its own container 825, rather than enabling the data to be shared across other applications.

FIG. 9 illustrates the mobile device 800 with the second user logged into the device and the second application 900 operating. At this point, both the first user and the second user have stored notes regarding the content 860 in their respective multi-application containers 835 and 850. In this example, the second application 900 reads both the content 860 from the system-wide container 855 as well as the notes 905 from the second user-specific container 850. The notes 905 might have been stored by either the first application 805 or the second application 900 with the second user logged into the device in a previous instance. In some examples, the first application 805 might be able to read and write notes while the second application 900 only has the read capability (either due to restrictions placed on the containers or the functionality of the application itself).

Figure 10:
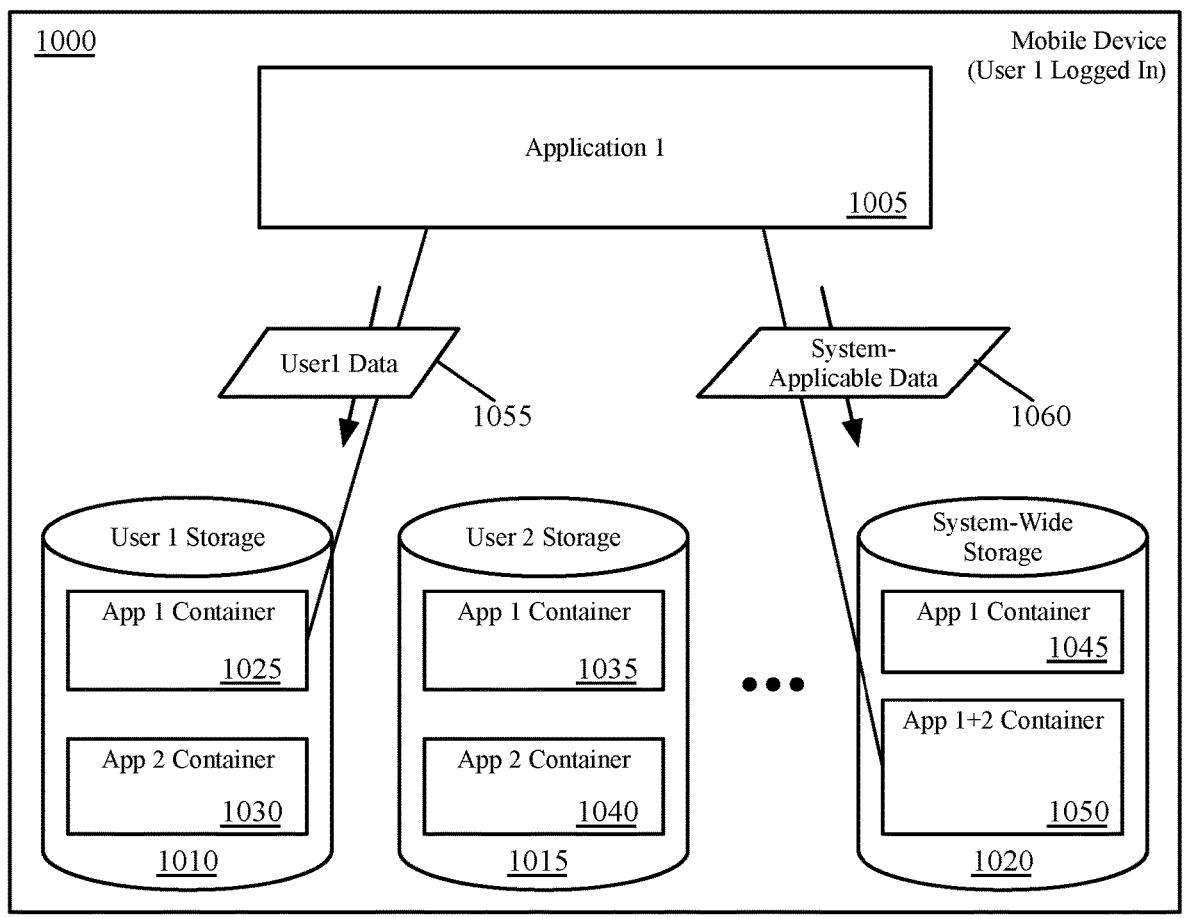
FIGS. 10-12 illustrate an example of a system-wide container shared between multiple applications but with different read/write privileges for different applications.
Figure 11:
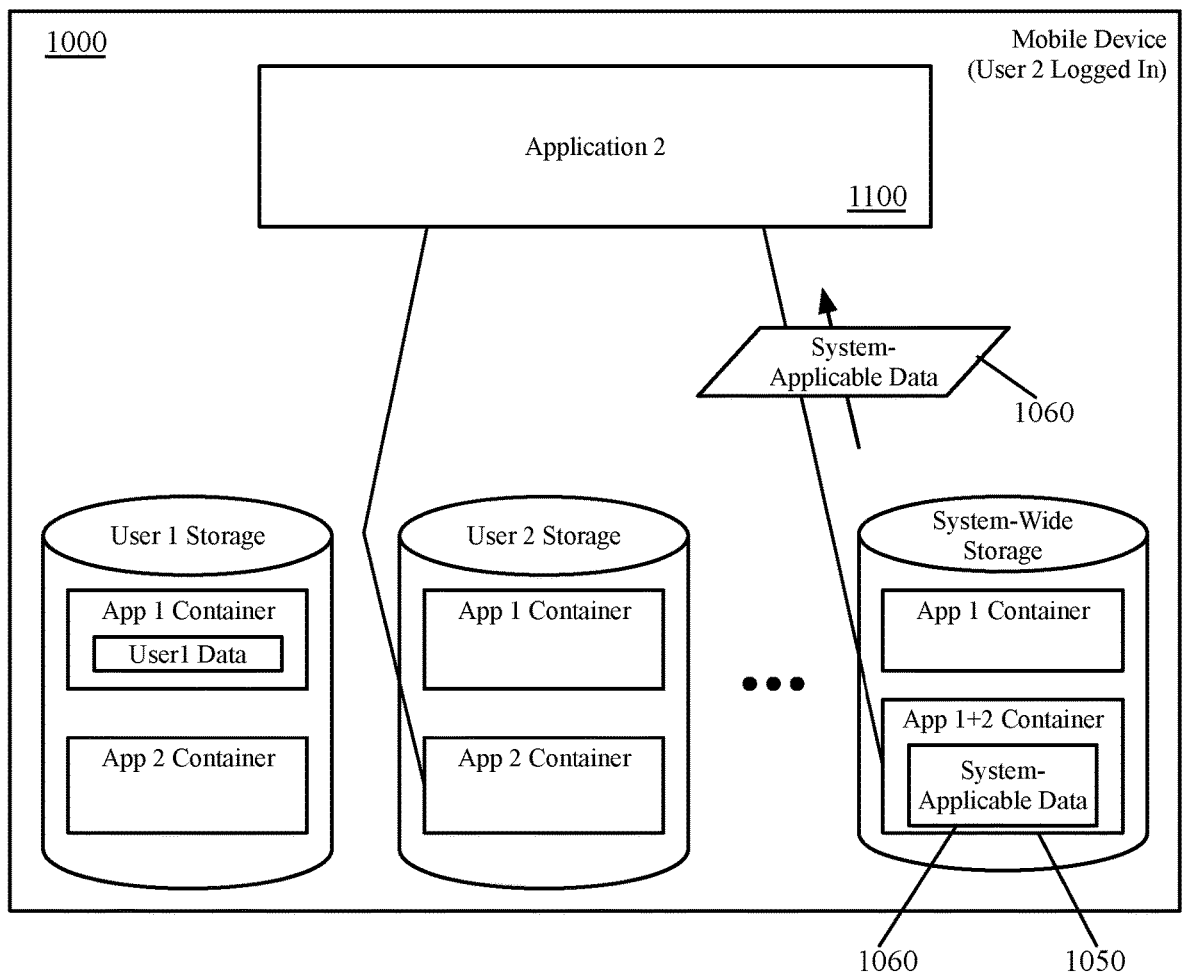
Figure 12:
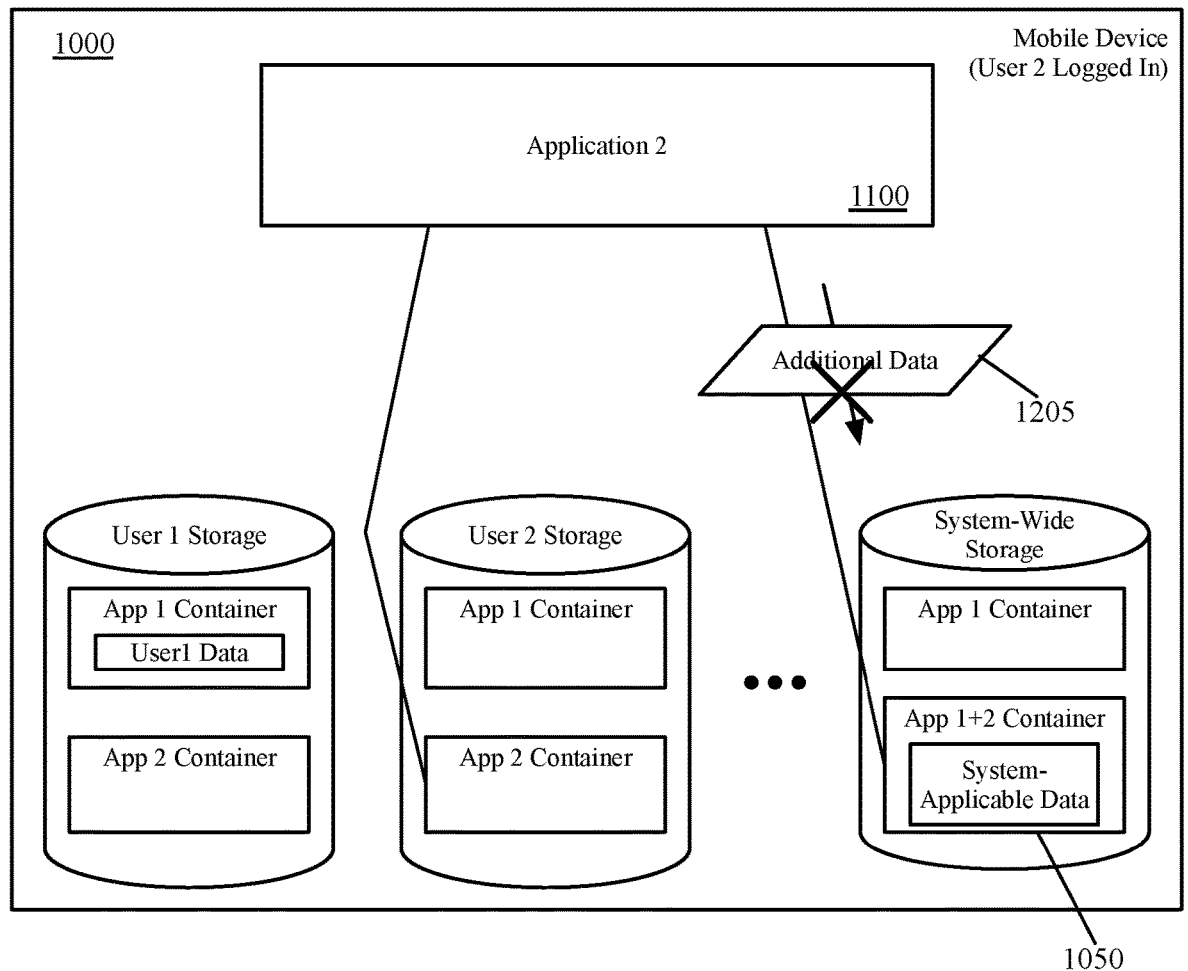

FIGS. 10-12 illustrate an example of a system-wide container shared between multiple applications but with different read/write privileges for different applications. FIG. 10 illustrates a mobile device 1000 with a first user logged in and a first application 1005 operating. As shown, the mobile device 1000 includes storages 1010 and 1015 for at least first and second users as well as a system-wide storage 1020. The storage 1010 for the first user includes a container 1025 for the first application 1005 and a container 1030 for a second application. Similarly, the storage for the second user includes a container 1035 for the first application 1005 and a container 1040 for the second application. The system-wide storage 1020, meanwhile, includes a container 1045 for the first application 1005 and a container 1050 shared by both the first and second applications. In this case, the second application does not store or use any system-wide data except that data also shared with the first application.

Though not apparent in this figure, the container 1050 is readable by both the first and second applications, but only writeable by the first application 1005. As an example, in some embodiments the device may include a mapping application with a background process (daemon) responsible for communicating with a map server to download map tiles and caching those map tiles for use in displaying maps in the mapping application. However, additional applications on the device may also use these maps within their displays, but do not contact the map server themselves and thus rely on the daemon. Thus, some embodiments use a shared container and make that container available to multiple applications, so that tiles downloaded once by the mapping application process can be used by these other applications. In addition, so as to avoid duplicate downloading of map tiles, the tiles are shared across all users of the device. As only the mapping application process should be able to write to this container, however, all other applications are granted read-only privileges to the shared container, irrespective of the user of the device.

In FIG. 10, as mentioned, the first user of the device is logged into the device. During this time, the application 1005 stores both user-specific data 1055 in its user-specific container 1025 as well as system-applicable data 1060 in its system-wide container 1050 that is shared with the second application. Referring to the mapping application example, the application might store searches performed by the user in the user-specific data (as this information is private and should not be shared between users) but store reusable map tiles in the system-wide shared container.

FIG. 11 illustrates the mobile device 1000 at a later time with the second user logged into the device and a second application 1100 operating. In this case, the second application 1100 reads at least a portion of the system-applicable data 1060 from the system-wide container 1050 shared with the first application. FIG. 12 then illustrates the same situation with the second user logged into the device 1000 and the second application 1100 operating. In this case, however, the second application 1100 attempts to store additional data 1050. However, the container management modules (e.g., the sandboxing module or modules) do not allow this data to be stored in the container 1050 because the application does not have write privileges to the container.

Figure 13:
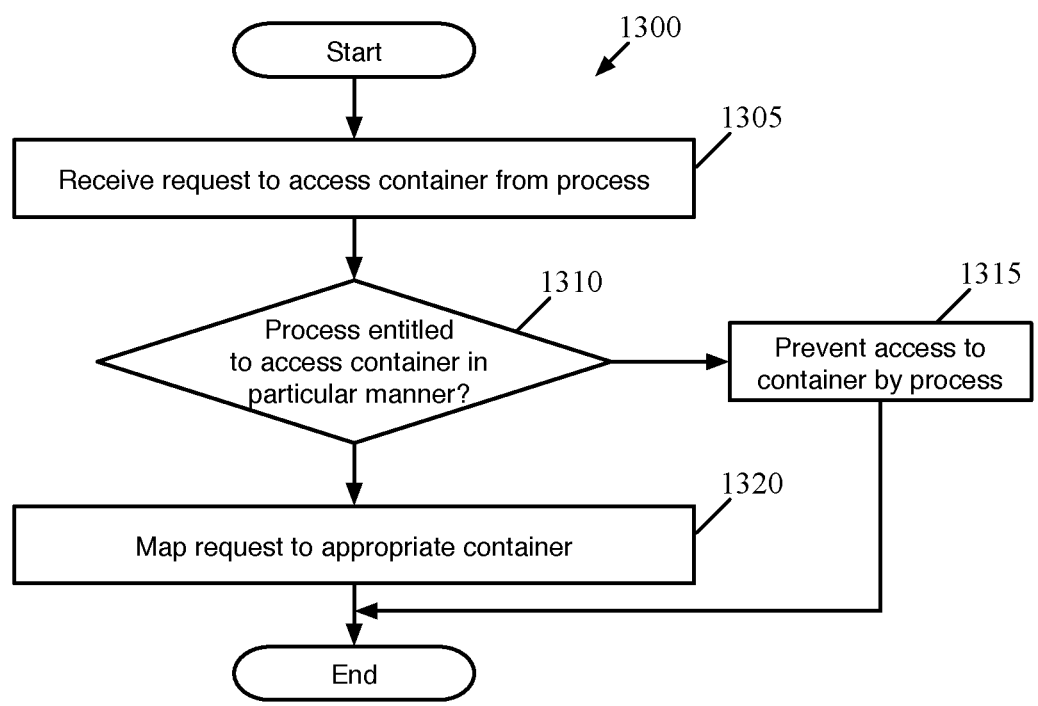
FIG. 13 conceptually illustrates a process of some embodiments performed during runtime to segregate access of a process to only its own containers.

As described above, a container access module (e.g., a sandboxing process in the OS kernel) handles access of the various applications and other processes on the device to their respective containers. FIG. 13 conceptually illustrates a process 1300 of some embodiments performed by such a sandboxing process during runtime to segregate access of a process to only its own containers (and to only allow permitted types of access to those containers).

As shown, the process 1300 begins by receiving (at 1305) a request to access a container from a running process. The process making the request may be an OS process, native application, third-party application, etc., and the request may be a read call or write call to either read data from a container or store data in a container. In addition, the request will not specify the container by name, as the container directory names are not known to the processes that use them, but instead are only known to the container management and access processes. Thus, a call to read data from or write data to a folder in the current user's directory will simply specify that it is a call to a folder in the user-specific root directory, rather than the full path in the device file system. Similarly, a call to a system-wide container will specify the desired folder in the process' system-wide root directory, but will not have the full path including the name of the container that corresponds to the root directory.

The process 1300 then determines (at 1310) whether the process making the request is entitled to access the container in the desired manner (i.e., read and/or write access). In some embodiments, the sandboxing module makes this decision based on information received from a container management daemon that provides the sandboxing module with information on the various processes currently running on the device, including their permitted containers and the type of access permitted for those containers. Based on this data for the requesting process, the sandboxing module makes the determination whether the request should be permitted.

When the request is not permitted, the process 1300 prevents (at 1315) access to the container by the requesting process. In some embodiments, a message is simply sent back to the process indicating that it does not have access to the requested directory. In other embodiments, a message is sent to other OS-level processes that monitor security on the device and/or a message is displayed to the user to indicate that the process is requesting unauthorized data access.

On the other hand, when the request is permitted, the process 1300 maps (at 1320) the request to the appropriate container and allows the access. In some embodiments, this also entails writing the data to and/or reading the data from this container and passing any read data back to the process, thereby acting as an intermediary in the read/write process. The sandboxing module uses the container:process mappings received from a container manager daemon in some embodiments to perform this mapping, from a generic home directory request to an actual location in the device file system. The process 1300 then ends.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 14:
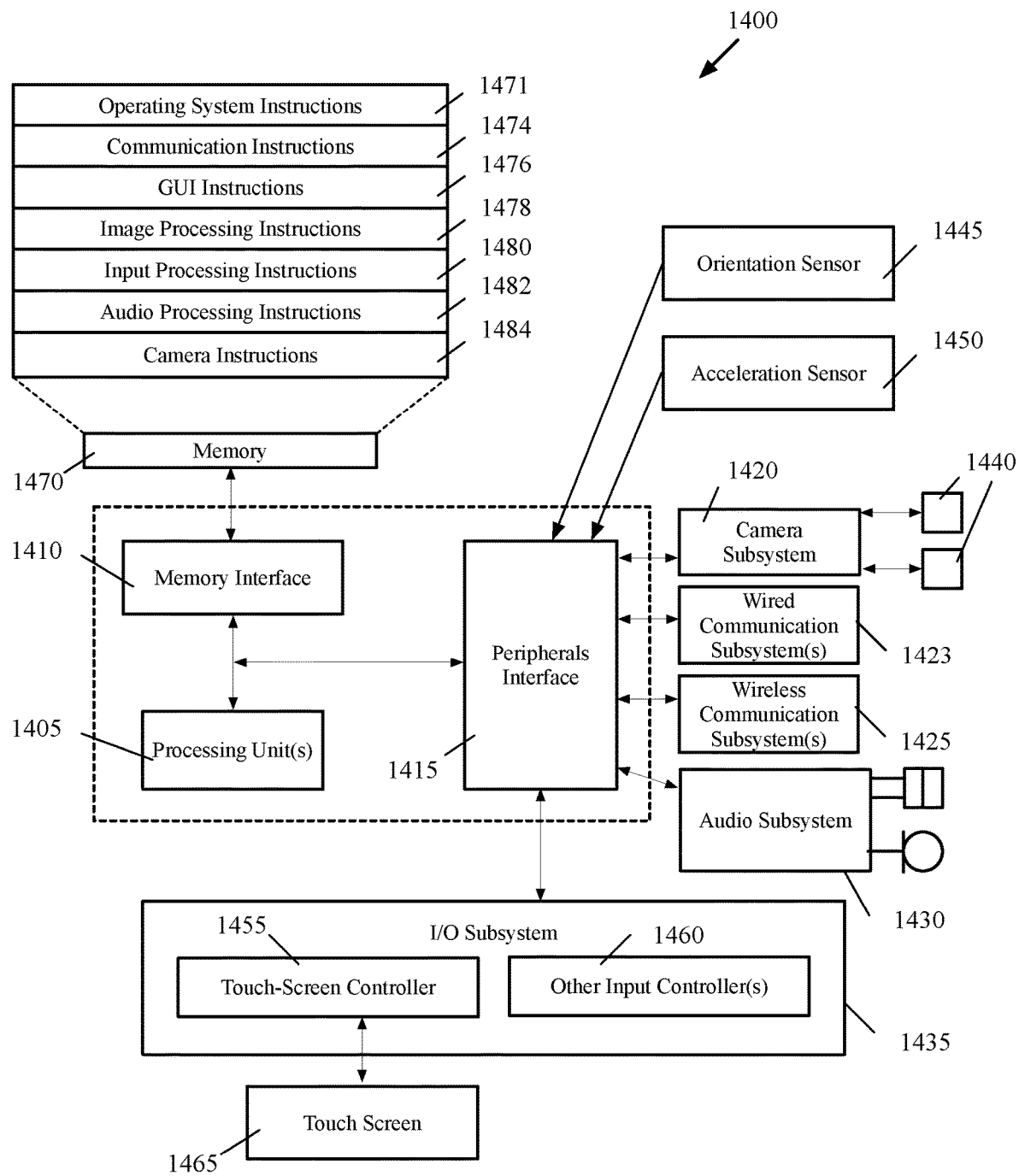
FIG. 14 is an example of an architecture of a mobile computing device of some embodiments.

The user data sharing of some embodiments occurs on mobile devices, such as smart phones (e.g., iPhones®) and tablets (e.g., iPads®). FIG. 14 is an example of an architecture 1400 of such a mobile computing device. As shown, the mobile computing device 1400 includes one or more processing units 1405, a memory interface 1410 and a peripherals interface 1415.

The peripherals interface 1415 is coupled to various sensors and subsystems, including a camera subsystem 1420, a wired communication subsystem(s) 1423, a wireless communication subsystem(s) 1425, an audio subsystem 1430, an I/O subsystem 1435, etc. The peripherals interface 1415 enables communication between the processing units 1405 and various peripherals. For example, an orientation sensor 1445 (e.g., a gyroscope) and an acceleration sensor 1450 (e.g., an accelerometer) is coupled to the peripherals interface 1415 to facilitate orientation and acceleration functions.

The camera subsystem 1420 is coupled to one or more optical sensors 1440 (e.g., a charged coupled device (CCD) optical sensor, a complementary metal-oxide-semiconductor (CMOS) optical sensor, etc.). The camera subsystem 1420 coupled with the optical sensors 1440 facilitates camera functions, such as image and/or video data capturing. The wired communication subsystem 1423 and wireless communication subsystem 1425 serve to facilitate communication functions.

In some embodiments, the wireless communication subsystem 1425 includes radio frequency receivers and transmitters, and optical receivers and transmitters (not shown in FIG. 14). These receivers and transmitters of some embodiments are implemented to operate over one or more communication networks such as a GSM network, a Wi-Fi network, a Bluetooth network, etc. The audio subsystem 1430 is coupled to a speaker to output audio (e.g., to output voice navigation instructions). Additionally, the audio subsystem 1430 is coupled to a microphone to facilitate voice-enabled functions in some embodiments.

The I/O subsystem 1435 involves the transfer between input/output peripheral devices, such as a display, a touch screen, etc., and the data bus of the processing units 1405 through the peripherals interface 1415. The I/O subsystem 1435 includes a touch-screen controller 1455 and other input controllers 1460 to facilitate the transfer between input/output peripheral devices and the data bus of the processing units 1405. As shown, the touch-screen controller 1455 is coupled to a touch screen 1465. The touch-screen controller 1455 detects contact and movement on the touch screen 1465 using any of multiple touch sensitivity technologies. The other input controllers 1460 are coupled to other input/ control devices, such as one or more buttons. Some embodiments include a near-touch sensitive screen and a corresponding controller that can detect near-touch interactions instead of or in addition to touch interactions.

The memory interface 1410 is coupled to memory 1470. In some embodiments, the memory 1470 includes volatile memory (e.g., high-speed random access memory), non-volatile memory (e.g., flash memory), a combination of volatile and non-volatile memory, and/or any other type of memory. As illustrated in FIG. 14, the memory 1470 stores an operating system (OS) 1471. The OS 1471 includes instructions for handling basic system services and for performing hardware dependent tasks.

The memory 1470 also includes communication instructions 1474 to facilitate communicating with one or more additional devices (e.g., for peer-to-peer data sharing, or to connect to a server through the Internet for cloud-based data sharing); graphical user interface instructions 1476 to facilitate graphic user interface processing; image processing instructions 1478 to facilitate image-related processing and functions; input processing instructions 1480 to facilitate input-related (e.g., touch input) processes and functions; audio processing instructions 1482 to facilitate audio-related processes and functions; and camera instructions 1484 to facilitate camera-related processes and functions. The instructions described above are merely exemplary and the memory 1470 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 14 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 14 may be split into two or more integrated circuits.

B. Computer System

Figure 15:
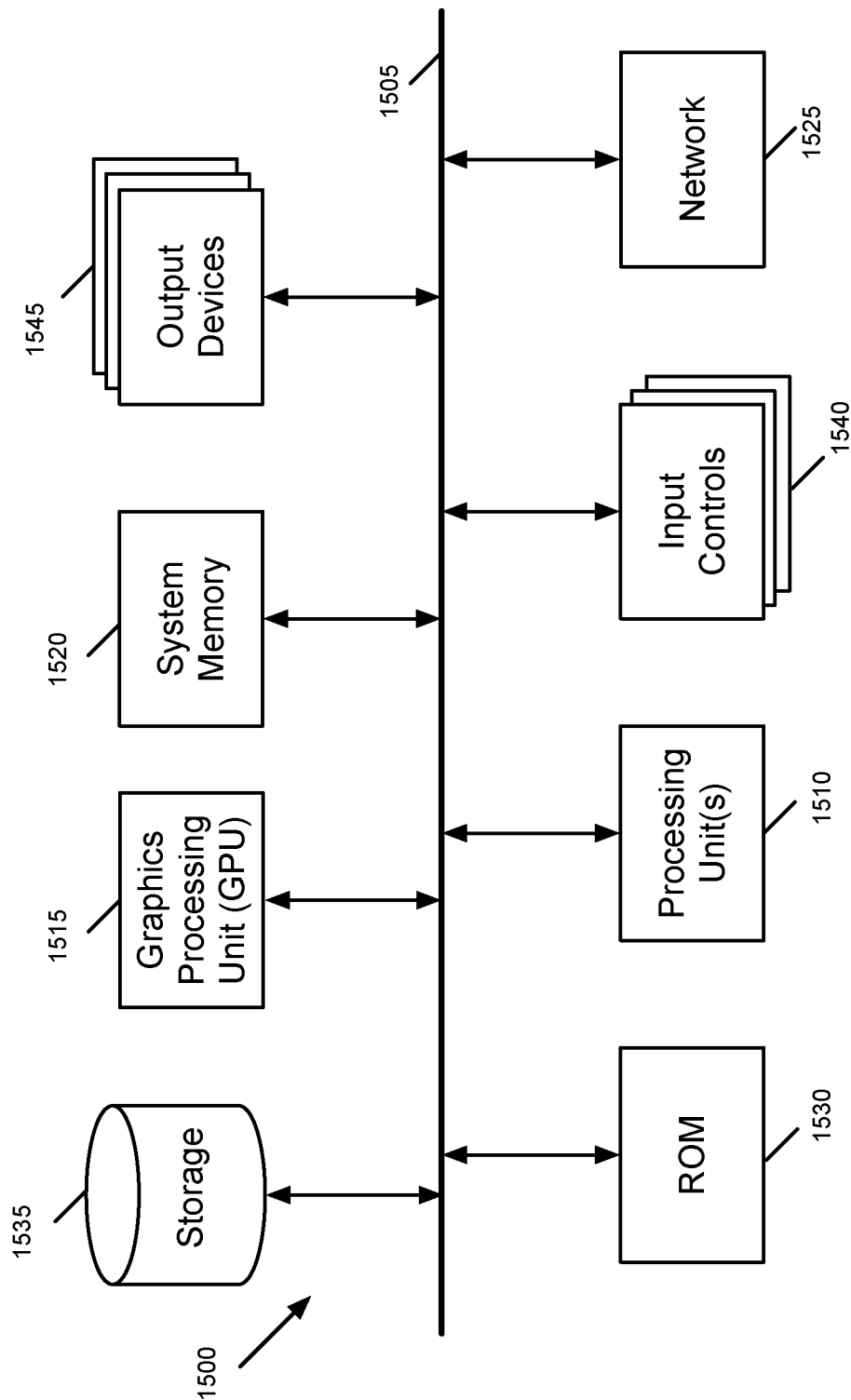
FIG. 15 conceptually illustrates an example of an electronic system with which some embodiments of the invention are implemented.

FIG. 15 conceptually illustrates another example of an electronic system 1500 with which some embodiments of the invention are implemented. The electronic system 1500 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1500 includes a bus 1505, processing unit(s) 1510, a graphics processing unit (GPU) 1515, a system memory 1520, a network 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the GPU 1515, the system memory 1520, and the permanent storage device 1535.

From these various memory units, the processing unit(s) 1510 retrieves instructions to execute and data to process in order to execute the processes of the invention. The processing unit(s) may be a single processor or a multi-core processor in different embodiments. Some instructions are passed to and executed by the GPU 1515. The GPU 1515 can offload various computations or complement the image processing provided by the processing unit(s) 1510. In some embodiments, such functionality can be provided using CoreImage's kernel shading language.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive, integrated flash memory) as the permanent storage device 1535.

Other embodiments use a removable storage device (such as a floppy disk, flash memory device, etc., and its corresponding drive) as the permanent storage device. Like the permanent storage device 1535, the system memory 1520 is a read-and-write memory device. However, unlike storage device 1535, the system memory 1520 is a volatile read-and-write memory, such a random access memory. The system memory 1520 stores some of the instructions and data that the processor needs at runtime. In some embodiments, the invention's processes are stored in the system memory 1520, the permanent storage device 1535, and/or the read-only memory 1530. For example, the various memory units include instructions for processing multimedia clips in accordance with some embodiments. From these various memory units, the processing unit(s) 1510 retrieves instructions to execute and data to process in order to execute the processes of some embodiments.

The bus 1505 also connects to the input and output devices 1540 and 1545. The input devices 1540 enable the user to communicate information and select commands to the electronic system. The input devices 1540 include alpha-numeric keyboards and pointing devices (also called "cursor control devices"), cameras (e.g., webcams), microphones or similar devices for receiving voice commands, etc. The output devices 1545 display images generated by the electronic system or otherwise output data. The output devices 1545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 15, bus 1505 also couples electronic system 1500 to a network 1525 through a network adapter (not shown). In this manner, the computer can be a part of a network of computers (such as a local area network ("LAN"), a wide area network ("WAN"), or an Intranet), or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (including FIGS. 4 and 13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method comprising:
identifying a process installed on a device that requests an isolated storage in a file system of the device;
for each respective user of a set of users of the device, assigning at least one container for use by the process within a user-specific section of the file system, wherein containers assigned to the process in a section of the file system specific to a particular user of the set of users are only accessible by the process when the particular user is logged into the device, and the process is prevented from directly accessing the at least one container in the user-specific section of the file system;
assigning at least one container for use by the process within a non-user-specific section of the file system, the non-user-specific section of the file system being separate from the user-specific section of the file system, wherein the at least one container within the non-user-specific section of the file system is accessible by the process when each respective user of the set of users is logged into the device, and the process is prevented from directly accessing the at least one container in the non-user-specific section of the file system; and
mapping data read and write requests received from the process to the at least one container within the user-specific section of the file system or the at least one container in the non-user-specific section of the file system.

2. The method of claim 1, wherein the process comprises at least one of: (i) a daemon operating in a background of the device, (ii) an application installed on the device prior to use of the device, or (iii) a third-party application installed on the device by a user of the device.

3. The method of claim 1, wherein assigning the at least one container for use by the process within the user-specific section of the file system comprises:
generating a randomized string as a container name;
creating a directory within the user-specific section of the file system with the container name; and
allowing only the process access to the created directory only when the particular user associated with the user-specific section of the file system is logged into the device.

4. The method of claim 1, wherein assigning the at least one container for use by the process within the non-user-specific section of the file system comprises:
generating a randomized string as a container name;
creating a directory within the non-user-specific section of the file system with the container name; and
allowing only the process access to the directory when each respective user of the set of users is logged into the device.

5. The method of claim 1, further comprising:
controlling, by an operating-system level process, access by the process to the at least one container within the user-specific section of the file system and to the at least one container within the non-user-specific section of the file system.

6. The method of claim 5, wherein the mapping is performed by the operating-system level process.

7. The method of claim 1, wherein the process (i) stores a first set of data in a first container in the user-specific section of the file system specific to a first user when the first user is logged into the device and (ii) a second set of data in a second container in the user-specific section of the file system specific to a second user when the second user is logged into the device.

8. The method of claim 1, wherein:
with a first user logged into the device, the process downloads and stores an encrypted set of data in the assigned at least one container within the non-user-specific section of the file system; and
with a second user logged into the device, the process accesses the downloaded and encrypted set of data stored in the assigned at least one container within the non-user-specific section of the file system.

9. The method of claim 1, wherein the process is a first process and a particular container of the assigned at least one container in the non-user-specific section of the file system is assigned to both the process and a second, different process.

10. The method of claim 9, wherein the process is allowed to both read from and write to the particular container, while the second process is only allowed to read from the particular container.

11. The method of claim 1, wherein the process is configured to download one or more content files, and the at least one container assigned to the process in the section of the file system specific to the particular user are used to store user-specific data about the one or more content files, the user-specific data being specific to the particular user and the user-specific data being separate from the one or more content files.

12. The method of claim 1, wherein the user-specific section of the file system comprises a first directory and the non-user-specific section of the file system comprises a second directory that is separate from the first directory.

13. A device comprising:
a set of processing units; and
a non-transitory machine readable medium storing a program for execution by at least one of the set of processing units, the program comprising sets of instructions for:
identifying a process of a plurality of processes on the device that requests an isolated storage in a file system of the device;
for each of a set of users of the device, assigning at least one container for use by the process within a user-specific section of the file system, wherein containers assigned to the process in a section of the file system specific to a particular user are only accessible by the process when the particular user is logged into the device;
assigning at least one container for use by the process within a non-user-specific section of the file system; and
controlling, by an operating-system level process, access by the plurality of processes to the at least one container within the user-specific section of the file system and to the at least one container within the non-user-specific section of the file system.

14. The device of claim 13, wherein the process comprises at least one of: (i) a daemon operating in a background of the device, (ii) an application installed on the device prior to use of the device, or (iii) a third-party application installed on the device by a user of the device.

15. The device of claim 13, wherein the set of instructions for assigning at least one container for use by the process within the user-specific section of the file system comprises sets of instructions for:
generating a randomized string as a container name;
creating a directory within the user-specific section of the file system with the container name; and
allowing only the process access to the created directory only when the particular user associated with the user-specific section of the file system is logged into the device.

16. The device of claim 13, wherein the set of instructions for assigning at least one container for use by the process within the non-user-specific section of the file system comprises sets of instructions for:
generating a randomized string as a container name;
creating a directory within the non-user-specific section of the file system with the container name; and
allowing the process and at least one other process access to the directory irrespective of which user is logged into the device.

17. The device of claim 13, wherein:
with a first user logged into the device, the process stores a set of data in the assigned at least one container within the non-user-specific section of the file system; and
with a second user logged into the device, the process accesses the set of data stored in the assigned at least one container within the non-user-specific section of the file system.

18. A non-transitory machine readable medium storing a program for execution by at least one processing unit of a device, the program comprising sets of instructions for:
identifying a process on the device that requests an isolated storage in a file system of the device;
for each of a set of users of the device, assigning at least one container for use by the process within a user-specific section of the file system, wherein the at least one container assigned to the process in a section of the file system specific to a particular user are only accessible by the process when the particular user is logged into the device;
assigning at least one container for use by the process within a non-user-specific section of the file system, wherein the at least one container within the non-user-specific section of the file system is accessible by the process irrespective of which user of the set of users is logged into the device; and
controlling, by an operating system-level process, access by the process to the at least one container within the user-specific section of the file system and the non-user-specific section of the file system.

19. The non-transitory machine readable medium of claim 18, wherein the program further comprises sets of instructions for:
mapping, by the operating system-level process, data read and write requests received from the process to the at least one container within the user-specific section of the file system or the at least one container in the non-user-specific section of the file system.

20. The non-transitory machine readable medium of claim 19, wherein first user-specific data is stored in a first container in the user-specific section of the file system specific to a first user when the first user is logged into the device and second user-specific data is stored in a second container in the user-specific section of the file system specific to a second user when the second user is logged into the device.

21. The non-transitory machine readable medium of claim 20, wherein the process (i) stores a set of data in the first container in the user-specific section of the file system specific to the first user when the first user is logged into the device and (ii) stores another set of data in the second container in the user-specific section of the file system specific to the second user when the second user is logged into the device.

22. The non-transitory machine readable medium of claim 18, wherein (i) the process is a first process, (ii) a particular container of the assigned at least one container in the non-user-specific section of the file system is assigned to both the first process and a second, different process, and (iii) the first process is allowed to both read from and write to the particular container while the second process is only allowed to read from the particular container.

* * * * *